(12) United States Patent
Eversheim et al.

(10) Patent No.: US 6,258,968 B1
(45) Date of Patent: Jul. 10, 2001

(54) METHOD FOR PRODUCING ORGANOFUNCTIONAL SILOXANES AND USE OF SAME

(75) Inventors: Hubertus Eversheim, Wermelskirchen; Ottfried Schlak, Köln, both of (DE)

(73) Assignee: GE Bayer Silicones GmbH & Co. KG, Erkrath (DE)

( * ) Notice: Subject to any disclaimer, the term of this patent is extended or adjusted under 35 U.S.C. 154(b) by 0 days.

(21) Appl. No.: 09/367,668

(22) PCT Filed: Feb. 9, 1998

(86) PCT No.: PCT/EP98/00700

§ 371 Date: Dec. 10, 1999

§ 102(e) Date: Dec. 10, 1999

(87) PCT Pub. No.: WO98/37126

PCT Pub. Date: Aug. 27, 1998

(30) Foreign Application Priority Data

Feb. 20, 1997 (DE) .............................................. 197 06 646

(51) Int. Cl.$^7$ .................................. C07F 7/08; C07F 7/10
(52) U.S. Cl. ............................................................. 556/425
(58) Field of Search ................................... 556/425, 438, 556/445

(56) References Cited

U.S. PATENT DOCUMENTS

| | | | |
|---|---|---|---|
| 4,087,448 | 5/1978 | Rossmy et al. | 260/448.2 E |
| 4,340,495 | 7/1982 | Brown, Jr. | 252/78.3 |
| 4,584,360 | 4/1986 | Paul et al. | 528/14 |
| 4,895,968 | 1/1990 | Buese et al. | 556/462 |
| 4,897,459 | 1/1990 | Evans | 528/18 |

*Primary Examiner*—Paul F. Shaver
(74) *Attorney, Agent, or Firm*—Norris McLaughlin & Marcus

(57) ABSTRACT

Process for the preparation of organofunctional polysiloxanes, which comprises reacting cyclic dialkylsiloxanes with at least one compound of the type HO—R'—X, wherein X=—OH, —COOH, —NR"$_2$—, —CR"=CR"$_2$, and R=alkyl, aryl, alkylene, oxyalkylene or arylene, in the presence of an equilibration catalyst.

9 Claims, No Drawings

METHOD FOR PRODUCING ORGANOFUNCTIONAL SILOXANES AND USE OF SAME

The present invention relates to a process for the production of Si—O—C-linked organofunctional siloxanes and to the use thereof.

Organofunctionally modified siloxanes are widely used for modifying organic polymers. Siloxanes have hitherto been produced by means of two-stage production processes, in which the siloxane skeleton is initially synthesised and the desired organofunctional group is then introduced in a second step.

DE-A 3 334 782 discloses the reaction of an acetoxy end-stopped polysiloxane with dihydroxy compounds with elimination of acetic acid, while U.S. Pat. No. 578 562 describes the reaction of an SiOH end-stopped polysiloxane with diols with elimination of water. U.S. Pat. No. 3,419, 634, U.S. Pat. No. 3,821,325 and U.S. Pat. No. 3,832,419 describe processes for reacting Si—Cl end-stopped siloxanes with dihydroxyaryl groups and the use thereof as intermediates for the production of organopolysiloxane/polycarbonate block polymers. This two-stage process is, however, highly complex.

The object of the present invention was to provide a simplified process for the production of organofunctional siloxanes.

It has now been found that organofunctional polysiloxanes may very straightforwardly be produced by reacting cyclic dialkylsiloxanes with at least one compound of the type HO—R'—X, where X=—OH, —COOH, —NH$_2$—, —CH=CH$_2$ and R' is alkylene or arylene, in the presence of an equilibration catalyst, optionally in a hydrophobic solvent.

The present invention accordingly provides a process for the production of organofunctional polydiorganosiloxanes of the formula (I)

[R$_2$(XR'O)SiO$_{1/2}$]$_a$[R$_2$SiO$_{2/2}$]$_b$[R$_3$SiO$_{1/2}$]$_{2-a}$ where
0<a≦2, preferably 2,
b=0–500, preferably 20–100, and with the proviso that where b=0, a is 2 in the total,
X=—OH, —COOH, —NR"$_2$, —CR"=CR"$_2$,
R=C$_1$–C$_{18}$ alkyl, C$_6$–C$_{14}$ aryl, preferably phenyl, tolyl, C$_2$ and/or C$_3$ alkyl, and R'=C$_2$–C$_{18}$ alkylene, oxyalkylene, such as for example 2,2-bis-hydroxymethyl-1-butenol dialkyl ether, C$_6$–C$_{14}$ arylene and R"=H and/or C$_1$–C$_{18}$ alkyl, wherein the [R$_2$SiO$_{2/2}$] units are optionally attached together via O—R'—O linkages,
characterised in that at least one cyclic dialkylsiloxane is reacted with at least one compound of the type HO—R'—X in the presence of at least one equilibration catalyst, optionally in the presence of linear trialkylsiloxy-terminated siloxanes, preferably hexamethyldisiloxane, and optionally in a hydrophobic solvent
at temperatures of between 80 and 220° C., preferably of 130–170° C.

In another preferred embodiment of the process according to the invention, 0.5≦a≦1.5 applies in the organofunctional polysiloxane of the formula (I), i.e. they contain trimethylsiloxy groups. In the case of acid catalysis, the trimethylsiloxy groups are preferably added as hexamethyldisiloxane. In the case of alkaline catalysis, it is preferred to add short-chain trialkylsiloxy end-stopped siloxanes having C$_1$–C$_{18}$ alkyl, preferably methyl.

Cyclic dialkylsiloxanes having 4, 5 or 6 silicon atoms, preferably 4 or 5 silicon atoms, and bearing methyl residues as the alkyl residues are preferably used in the process according to the invention.

In a preferred embodiment of the process according to the invention, the cyclic dialkylsiloxane used comprises a mixture of cyclic dialkylsiloxane with up to 50 wt. % of short-chain hydroxy-terminated dialkylpolysiloxanes of the formula [HO$_{1/2}$]$_2$[R$_2$SiO$_{2/2}$]$_n$, where n=2–50. This mixture preferably comprises such a mixture as is obtained from the hydrolysis of chlorosilanes. In this case, water is formed by condensation of the SiOH group as well as the water from the reaction of the compound of the type HO—R'—X with the mixture.

A hydrophobic solvent is preferably additionally used to facilitate removal of the water of reaction.

An equilibration catalyst is taken to be a catalyst which is responsible for both chain synthesis and chain degradation in the reaction.

Equilibration catalysts preferably used in the process according to the invention comprise perfluoroalkylsulfonic acids, preferably C$_1$–C$_6$ perfluoroalkylsulfonic acids, individually or mixed with sulfuric acid, or alkali metal hydroxides, preferably potassium and caesium hydroxide. The equilibration catalyst is here preferably used in quantities of 500–5000 ppm, relative to the quantities of cyclic dialkylsiloxane and the compound HO—R'—X.

Selection of the catalyst is here determined by the functional alcohol used. In the case of aminoalcohols, basic catalysis is accordingly preferred, while in the case of phenolic alcohols or hydroxycarboxylic acids, acidic catalysis is preferred.

In the case of certain compounds of the type HOR'X, acid catalysis brings about not only the desired reaction, but also secondary reactions involving ether and ester formation or cleavage of the compound HOR'X. Ether formation is a particular problem with diols, which may form 5- or 6-membered cyclic ethers, such as for example the formation of dimethyltetrahydrofuran from 2,5-hexanediol. Diol cleavage is in particular observed in bishydroxyphenylalkanes, such as for example in the reaction of 2,2-bis-(4-hydroxyphenyl)propane to yield phenol and isopropenylphenol. These reactions may be partially avoided by suitable catalyst selection. Basic catalysts, such as for example caesium hydroxide, are preferred in this case. The cyclic dialkylsiloxane is preferably used in a ratio of 1 to 500 mol of dialkylsiloxy groups to 2 mol of the compound of the type HO—R'—X.

The hydrophobic solvent used in the process according to the invention preferably has a boiling point of ≧100° C. at atmospheric pressure and/or forms an azeotropic mixture with water. A certain degree of solubility of the compound of the type HOR'X used in the solvent used and/or in the siloxane, is favourable for the performance of the process according to the invention. Xylene, toluene or chlorobenzene are preferably used.

By using a hydrophobic solvent which has a boiling point of above 100° C. and/or a solvent which forms a minimum azeotropic mixture with water, it is possible to remove the water by refluxing in conventional water separators, while simultaneously controlling the rate of reaction. It has proved advantageous if the compound of the type HOR'X used has a boiling point above the solvent used and does not form an azeotropic mixture with water. Preferred combinations in this case are: toluene/hydroquinone, xylene/hydroquinone, xylene/2,2-bis(hydroxymethyl-1-butenol) diallyl ether as well as xylene/2,2-bis-(4-hydroxycyclohexyl)propane.

If compounds of the type HO—R'—X in which X=OH, i.e. dihydroxy compounds, are used in the process according to the invention, O—Si(R$_2$)—O—R'—O—Si(R$_2$)—O— linkages are also formed. The minimum ratio of Si(R$_2$)—OR'—OSiR$_2$ groups to the desired Si(R$_2$)—OR'OH end groups is primarily determined by the alcohol used and the ratio of alcohol to the separated quantity of water. Alcohols in which the OH groups interact by means of conjugated π electron systems, such as for example hydroquinone, have a stronger tendency to form Si(R$_2$)—OR'—OSiR$_2$ groups in the siloxane chain, than alcohols, such as for example 2,2-bis(4-hydroxycyclohexyl)propane, in which there is no interaction between the OH groups.

In those compounds having a primary and a secondary OH group, the more reactive primary OH group reacts preferentially with the siloxane.

The process according to the invention may be terminated by neutralising the catalyst. Preferred neutralising agents for the neutralisation are those which may be completely removed from the product once the reaction mixture has been worked up. NaHCO$_3$, soda and (NH$_4$)$_2$CO$_3$ are preferred in the case of acidic catalysis, while (CH$_3$)$_3$SiCl is preferred in the case of basic catalysis. The reaction mixture is preferably worked up by removing solvent and remaining cyclic compounds as well as any remaining volatile compounds of the type HOR'X by distillation under reduced pressure, and filtering out the neutralised equilibration catalyst and the remaining solid compounds of the type HOR'X.

The present invention additionally provides the use of the organofunctional siloxanes produced using the process according to the invention for modifying organic polymers. In this case, the O—Si(R$_2$)—O—R'X groups formed are intended to react with the organic monomers or oligomers, resulting in incorporation into the polymer backbone.

The following non-limiting Examples are intended to illustrate the invention in greater detail.

PRACTICAL EXAMPLES

Example 1

740 g of octamethylcyclotetrasiloxane, 300 g of xylene and 73.3 g of hydroquinone were initially introduced into an inertised flask equipped with a thermometer, stirrer, water separator and reflux condenser. After purging with nitrogen, 1000 ppm of 98% sulfuric acid and 500 ppm of perfluoroalkylsulfonic acid were added. After heating to reflux, 6 ml of water were removed from the system within 30 minutes. The temperature was then rapidly reduced to 60° C. and stirring continued for two hours at 60° C. Once the catalyst had been neutralised with ammonium carbonate, volatile constituents were removed from the reaction mixture for 1 hour at 150° C. and a pressure of <1 mbar and the temperature was reduced to room temperature. Free hydroquinone, excess neutralising agent and the neutralisation products of the acids were then removed from the remaining residue by filtration through a Seitz vacuum filter, lined with a type K 300 filter, obtainable from the company Seitz, Germany. A clear to slightly turbid polysiloxane was obtained having a viscosity of 700 mPas at 23° C. and a composition, determined by $^1$H and $^{29}$Si spectroscopy, of:

Example 2

740 g of octamethylcyclotetrasiloxane, 300 g of xylene and 50 g of isopropanolamine were initially introduced into an inertised flask equipped with a thermometer, stirrer, water separator and reflux condenser. After purging with nitrogen, 4000 ppm of potassium hydroxide were added. After heating to reflux, 6 ml of water were removed from the system within 3 hours. The temperature was then reduced to 100° C., the catalyst neutralised with trimethylchlorosilane and volatile constituents were removed from the reaction mixture for 1 hour at 150° C. and a pressure of <1 mbar. After cooling to room temperature, potassium chloride was removed from the remaining residue by filtration through a Seitz vacuum filter, lined with a type K 300 filter (obtainable from the company Seitz, Germany). A clear to slightly turbid polysiloxane was obtained having a viscosity of 20 mPas at 23° C. and a composition, determined by $^1$H spectroscopy, of:

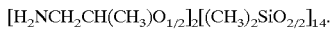

Example 3

740 g of octamethylcyclotetrasiloxane, 300 g of xylene and 240 g of 2,2-bis(4-hydroxycyclohexyl)propane were initially introduced into an inertised flask equipped with a thermometer, stirrer, water separator and reflux condenser. After purging with nitrogen, 1000 ppm of potassium hydroxide were added and, after heating to reflux, 18 ml of water were removed from the system within 2 hours. Once the catalyst had been neutralised with trimethylchlorosilane, volatile constituents were removed from the reaction mixture for 1 hour at 150° C. and a pressure of <1 mbar. After cooling to room temperature, free 2,2-bis(4-hydroxycyclohexyl)propane and potassium chloride were removed from the remaining residue by filtration through a Seitz vacuum filter, lined with a type K 300 filter, obtainable from the company Seitz, Germany. A clear to slightly turbid polysiloxane was obtained having a viscosity of 2000 mPas at 23° C. and a composition, determined by $^1$H and $^{29}$Si spectroscopy, of:

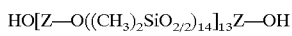

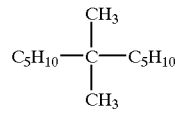

Example 4

740 g of octamethylcyclotetrasiloxane, 300 g of xylene and 78.8 g of 2,5-hexanediol were initially introduced into an inertised flask equipped with a thermometer, stirrer, water separator and reflux condenser. After purging with nitrogen, 2000 ppm of potassium hydroxide were added and, after heating to reflux, 6 ml of water were removed from the system within 2 hours. Once the catalyst had been neutralised with trimethylchlorosilane, volatile constituents were removed from the reaction mixture for 1 hour at 150° C. and a pressure of <1 mbar. After cooling to room temperature, potassium chloride was removed from the remaining residue by filtration through a Seitz vacuum filter, lined with a type K 300 filter, obtainable from the company Seitz, Germany. A clear to slightly turbid polysiloxane was obtained having a viscosity of 260 mPas at 23° C., an OH value of 19 mg of KOH/g and a composition, determined from $^1$H and OH value, of:

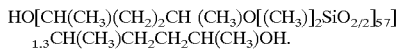

Example 5

740 g of octamethylcyclotetrasiloxane, 300 g of xylene and 107 g of 2,2-bis-hydroxymethyl-1-butenol diallyl ether were initially introduced into an inertised flask equipped with a thermometer, stirrer, water separator and reflux condenser. After purging with nitrogen, 2000 ppm of potassium hydroxide were added and, after heating to reflux, 4.5 ml of water were removed from the system within 3 hours. Once the catalyst had been neutralised with trimethylchlorosilane, volatile constituents were removed from the reaction mixture for 1 hour at 150° C. and a pressure of <1 mbar. After cooling to room temperature, potassium chloride was removed from the remaining residue by filtration through a Seitz vacuum filter, lined with a type K 300 filter, obtainable from the company Seitz, Germany. A clear to slightly turbid polysiloxane was obtained having a viscosity of 100 mPas at 23° C. and a composition, determined by $^1$H spectroscopy, of:

$[(CH_2=CH-CH_2OCH_2)_2C(C_2H_5)CH_2O_{1/2}]_2[(CH_3)_2SiO_{2/2}]_{57}$.

Example 6

695 g of octamethylcyclotetrasiloxane, 300 g of xylene, 53.5 g of 2,2-bis-hydroxymethyl-1-butenol diallyl ether and 66.5 g of a trimethylsiloxy end-stopped siloxane having 5 $(CH_3)_2SiO$ units were initially introduced into an inertised flask equipped with a thermometer, stirrer, water separator and reflux condenser. After purging with nitrogen, 2000 ppm of potassium hydroxide were added and, after heating to reflux, 2.25 ml of water were removed from the system within 3 hours. Once the catalyst had been neutralised with trimethylchlorosilane, volatile constituents were removed from the reaction mixture for 1 hour at 150° C. and a pressure of <1 mbar. After cooling to room temperature, potassium chloride was then removed from the remaining residue by filtration through a Seitz vacuum filter, lined with a type K 300 filter, obtainable from the company Seitz, Germany. A clear to slightly turbid polysiloxane was obtained having a viscosity of 100 mPas at 23° C. and a composition, determined by $^1$H and $^{29}$Si nuclear magnetic resonance spectroscopy, of:

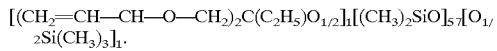

$[(CH_2=CH-CH-O-CH_2)_2C(C_2H_5)O_{1/2}]_1[(CH_3)_2SiO]_{57}[O_{1/2}Si(CH_3)_3]_1$.

What is claimed is:

1. Process for the production of organofunctional polydiorganosiloxanes of the formula (I)

$[R_2(XR'O)SiO_{1/2}]_a[R_2SiO_{2/2}]_b[R_3SiO_{1/2}]_{2-a}$ where $0<a\leq 2$, b=0–500, and with the proviso that where b=0, a is 2 in the total,

X=—OH, —COOH, —NR''$_2$, —CR''=CR''$_2$,

R=C$_1$–C$_{18}$ alkyl, C$_6$–C$_{14}$ aryl and R'=C$_2$–C$_{18}$ alkylene, oxyalkylene, C$_6$–C$_{14}$ arylene and R''=H and/or C$_1$–C$_{18}$ alkyl, wherein the [R$_2$SiO$_{2/2}$] units are optionally attached together via O—R'—O linkages, wherein at least one cyclic dialkylsiloxane is reacted with at least one compound of the type HO—R'—X in the presence of at least one equilibration catalyst, optionally in the presence of linear trialkylsiloxy-terminated siloxanes, where alkyl=C$_1$–C$_{18}$ alkyl, and optionally in a hydrophobic solvent at temperatures of between 80 and 220° C.

2. Process according to claim 1, wherein the cyclic dialkylsiloxane used comprises compounds which have 4, 5 or 6 silicon atoms and bear methyl residues as the alkyl residues.

3. Process according to claim 1 wherein the cyclic dialkylsiloxane used comprises a mixture of cyclic dialkylsiloxane and up to 50 wt. % of short-chain hydroxy-terminated dialkylpolysiloxanes.

4. Process according to claim 1, wherein the equilibration catalyst used comprises perfluoroalkylsulfonic acids, individually or mixed with sulfuric acid, or alkali metal hydroxides.

5. Process according to claim 1, wherein the equilibration catalyst is used in quantities of 500 to 5000 ppm, relative to the quantities of cyclic dialkylsiloxane and the compound of the type HO—R'—X.

6. Process according to claim 1, wherein the hydrophobic solvent used comprises those which have a boiling point of $\geq 100°$ C. at atmospheric pressure, form an azeotropic mixture with water or both.

7. Process according to claim 1, wherein xylene, toluene, chlorobenzene, or a combination thereof, is used as the solvent.

8. Process according to claim 1, wherein the cyclic dialkylsiloxane is used in a ratio of 1 to 500 mol of dialkylsiloxy groups to 2 mol of the compound of the type HO—R'—X.

9. A method for modifying organic polymers which comprises reacting the organofunctional polydiorganosiloxanes of claim 1 with said polymers or with monomers or oligomers from which said polymers are formed.

* * * * *